(12) United States Patent
Kazar et al.

(10) Patent No.: US 7,987,167 B1
(45) Date of Patent: Jul. 26, 2011

(54) ENABLING A CLUSTERED NAMESPACE WITH REDIRECTION

(75) Inventors: Michael Kazar, Pittsburgh, PA (US); Michael Eisler, Colorado Springs, CO (US); E. Rudolph Nedved, Mercer, PA (US); Emily Eng, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 403 days.

(21) Appl. No.: 11/499,493

(22) Filed: Aug. 4, 2006

(51) Int. Cl.
G06F 17/00 (2006.01)
(52) U.S. Cl. ........ 707/705; 707/709; 707/716; 707/726; 707/609; 709/201
(58) Field of Classification Search .................. 709/201; 707/609, 705
See application file for complete search history.

(56) References Cited

U.S. PATENT DOCUMENTS

| | | | |
|---|---|---|---|
| 4,570,217 A | | 2/1986 | Allen et al. |
| 5,124,987 A | | 6/1992 | Milligan et al. |
| 5,163,131 A | | 11/1992 | Row et al. |
| 5,202,979 A | | 4/1993 | Hillis et al. |
| 5,278,979 A | | 1/1994 | Foster et al. |
| 5,403,667 A | | 4/1995 | Simoens |
| 5,581,724 A | | 12/1996 | Belsan et al. |
| 6,061,770 A | | 5/2000 | Franklin |
| 6,081,875 A | | 6/2000 | Clifton et al. |
| 6,341,341 B1 | | 1/2002 | Grummon et al. |
| 7,127,577 B2 | | 10/2006 | Koning et al. |
| 2005/0144317 A1 * | | 6/2005 | Chase et al. .............. 709/238 |
| 2005/0193084 A1 * | | 9/2005 | Todd et al. ............... 709/214 |
| 2006/0010154 A1 * | | 1/2006 | Prahlad et al. ............ 707/102 |
| 2006/0248273 A1 * | | 11/2006 | Jernigan et al. ........... 711/114 |

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.
Bitton, Dina, *Disk Shadowing*, Proceedings of the 14th VLDB Conference, LA, CA 1988.
Chaudhuri, Surajit, et al., *Self-Tuning Technology in Microsoft SQL Server*, Data Engineering Journal 22, Feb. 1999 pp. 20-27.
Chutani, Sailesh, et al., *The Episode File System*, In Proceedings of the USENIX Winter 1992.
Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87/1177, Sep. 1987.
Gray, Jim, et al., *The Recovery Manager of the System R Database Manager*, ACM Computing Surveys, (13)2:223-242 1981.

(Continued)

*Primary Examiner* — Wilson Lee
*Assistant Examiner* — Tuan-Khanh Phan
(74) *Attorney, Agent, or Firm* — Cesari and McKenna, LLP

(57) ABSTRACT

Provided is a method and system for redirecting data access requests in a clustered computing environment. A clustered namespace applied to the clustered computing environment includes multiple modules for storing and manipulating data. The clustered namespace is enabled by using a replicated storage location repository listing storage locations distributed throughout the clustered computing environment. When searching for data, pathnames to storage locations are examined and compared with values listed in the storage location repository to identify a storage location to visit. A module associated with an identified storage location is visited to satisfy a data access request. If a redirection identifier is encountered when examining the metadata of the identified storage location, then the storage location repository is examined to find the next storage location to visit to satisfy the data access request.

22 Claims, 10 Drawing Sheets

OTHER PUBLICATIONS

Hecht, Matthew S., et al., *Shadowed Management of Free Disk Pages with Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063, 1988.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14( 2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beatirig the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al., *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester; UK; Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al., *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

\* cited by examiner

ENABLING A CLUSTERED NAMESPACE WITH REDIRECTION

TECHNICAL FIELD

Embodiments of the present invention relate to storage systems, and in particular, to redirecting data access requests in a clustered computing environment.

BACKGROUND

Networks of computers implement a namespace to identify particular computers of the network. For example, in computer network implementing a Domain Name System (DNS) namespace, a particular computer may be identified by "myname.network.com" where the computer is located in a subdomain "myname" of a secondary domain "network" of a top level domain "com." By uniquely identifying computers within a namespace, it is possible to find a particular computer of the network.

During write operations of data to computers in a network, the data may be written to any computer in the network. During a read operation for previously written data, the data can be found by first, identifying the computer where the data was originally written and second, obtaining the data from the identified computer. However, data may have moved from the first-identified computer or may have been deleted.

In some computer networks, if the data is not found at the identified computer during a read operation, then the result of the read operation is a message of "data not found." In other computer networks, the data may have moved, so instead of ending the read operation, the third step is to visit another computer for the written data. The identifier of this new computer is listed in the first-identified computer that was visited to obtain the written data. Consequently, when data is constantly moved, a chain of identifiers is distributed throughout the computer network in order to find data. However, following the chain of identifiers is time consuming and is difficult to administer because administration requires the explicit management of the distributed identifiers along the chain. Specifically, any mistake in the chain of identifiers results in a broken chain.

For example, suppose three computers of a network include a chain of identifiers. Computer-A includes an identifier-B for computer-B and computer-B includes an identifier-C for computer-C. If identifier-C is corrupted and not updated by an administrator, then there is a broken link in the chain of identifiers. Consequently, a search for data stored on computer-C may start with a visit to computer-A, which leads to computer-B. However, since identifier-C is corrupted, computer-C is never identified correctly and the data stored on computer-C is never provided.

Accordingly, what is needed is a method and system to navigate a network of computers where data may be distributed in any fashion, without requiring difficult, time-consuming administration of identifiers.

SUMMARY

Embodiments of the present invention provide a method and a system for redirecting requests for data stored in a clustered computing environment by enabling a clustered namespace. Since data can be written to any storage location of the clustered computing environment, the clustered computing environment is called a clustered storage system. When a data access request is made for data stored in the clustered storage system, unique identifiers of the clustered namespace identify particular storage locations of the clustered storage system.

The unique identifiers are included in a storage location repository that is replicated throughout the clustered storage system instead of creating a chain of identifiers. Further, instead of including an identifier in a storage location to act as a link in a chain of identifiers, a redirection identifier is included, which is an indication that the data is not stored in the storage location. When encountering the redirection identifier during a data access request, the storage location repository is examined to find the next storage location that may contain the data. Thus, instead of explicitly managing a chain of identifiers to multiple storage locations, redirection identifiers can be used to indicate that the replication storage location repository should be examined. By replicating the storage location repository, identifiers are updated in a central repository instead of the difficult and time-consuming administration task of updating chains of identifiers.

In an exemplary embodiment of a method for redirecting a data access request, the method includes receiving the data access request for data stored in a clustered storage system. Further, the method includes identifying a first storage location by examining a storage location repository and accessing the first storage location identified by the storage location repository to retrieve the data. The method also includes encountering a redirection identifier associated with the first storage location indicating that the data is not stored in the first storage location, thereby avoiding continued examination of the first storage location because the redirection identifier lacks an identifier to a second storage location.

In an exemplary embodiment of a storage system for redirecting data access requests, the storage system includes multiple disk modules in communication with a storage location repository. The storage location repository identifies at least one disk module and a redirection identifier of an identified disk module indicates that the data is not stored in the identified disk module. Thus, encountering the redirection identifier avoids continued examination of the identified disk module because the redirection identifier lacks an identifier to another disk module.

In an exemplary embodiment of a computing environment, the computing environment includes a memory store and a communication channel. The memory store of a first module is configured to store a storage location repository of volume identifiers. At least one of the volume identifiers identifies a location of a second module. The communication channel of the first module is communicably coupled to the second module, such that the second module includes a processor for processing instructions for the examination of a redirection identifier of the second module. The redirection identifier indicates that data is not stored in the second module, thereby avoiding continued examination of the second module because the redirection identifier lacks an identifier to a third module.

It should be appreciated that other aspects of the invention will become apparent from the following detailed description taken in conjunction with the accompanying drawings, which illustrates by way of example, the principles of the invention.

DETAILED DESCRIPTION

Embodiments of the present invention provide a method and a system for redirecting requests for data in a clustered computing environment by enabling a clustered namespace. The clustered namespace may be implemented with multiple namespaces such that the clustered computing environment can be shared among multiple customers. For example, customer-A may have access only to namespace-A and customer-B may have access only to namespace-B. Both namespaces exist in the clustered namespace of a single clustered computing environment such that company-A and company-B cannot access each other's data nor do they realize that they share the same environment.

Since data can be written to any storage location of the clustered computing environment, the clustered computing environment is called a clustered storage system. When a data access request is made for data stored in the clustered storage system, unique identifiers of the clustered namespace identify particular storage locations of the clustered storage system. The unique identifiers are included in a storage location repository that is replicated throughout the clustered storage system instead of creating a chain of identifiers. Further, instead of including an identifier in a storage location to act as a link in a chain of identifiers, a redirection identifier is included, which is an indication that the data is not stored in the storage location. An exemplary redirection identifier includes a junction, which is later described with respect to FIG. 6. When encountering the redirection identifier during a data access request, the storage location repository is examined to find the next storage location that may contain the data. Thus, instead of explicitly managing a chain of identifiers to multiple storage locations, redirection identifiers can be used to indicate that the replication storage location repository should be examined. By replicating the storage location repository, identifiers are updated in a central repository instead of the difficult and time-consuming administration task of updating chains of identifiers.

Distributed Storage System

Figure 1:
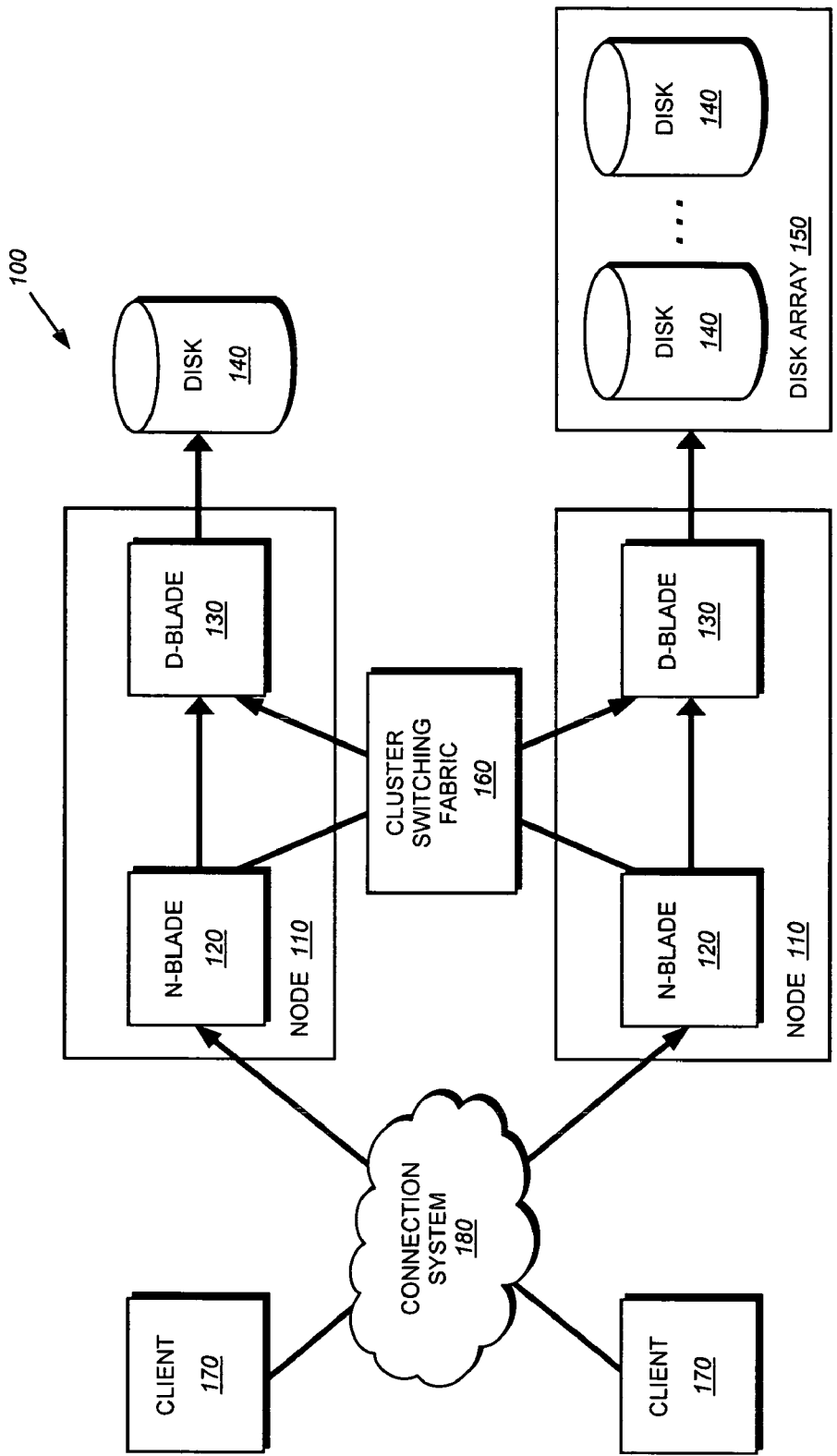
FIG. 1 is a diagram illustrating a cluster having a plurality of modules, in accordance with an embodiment of the invention.

FIG. 1 is a diagram illustrating a cluster 100 having a plurality of modules, in accordance with an embodiment of the invention. The modules, or nodes 110, comprise various functional components that cooperate to provide a distributed storage system architecture. To that end, each node 110 is generally organized as a network element (N-blade, or N-module 120) and a disk element (D-blade, or D-module 130). The N-blade 120 includes functionality that enables the node 110 to connect to clients 170 over a connection system 180, while each D-blade 130 connects to one or more storage devices, such as disks 140 or a disk array 150. The nodes 110 are interconnected by a cluster switching fabric 160 which, in the illustrative embodiment, may be embodied as a Gigabit Ethernet switch. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a configuration of a cluster 100 that does not reflect a one-to-one correspondence between the N and D-modules. As such, the description of a node 110 comprising one N-module and one D-module should be taken as illustrative only.

The clients 170 may be general-purpose computers configured to interact with the node 110 in accordance with a client/server model of information delivery. For example, interaction between the clients 170 and nodes 110 can enable the provision of storage services. That is, each client 170 may request the services of the node 110, and the node 110 may return the results of the services requested by the client 170, by exchanging packets over the connection system 180, which may be a wire-based or wireless communication system. The client 170 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client 170 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Figure 2:
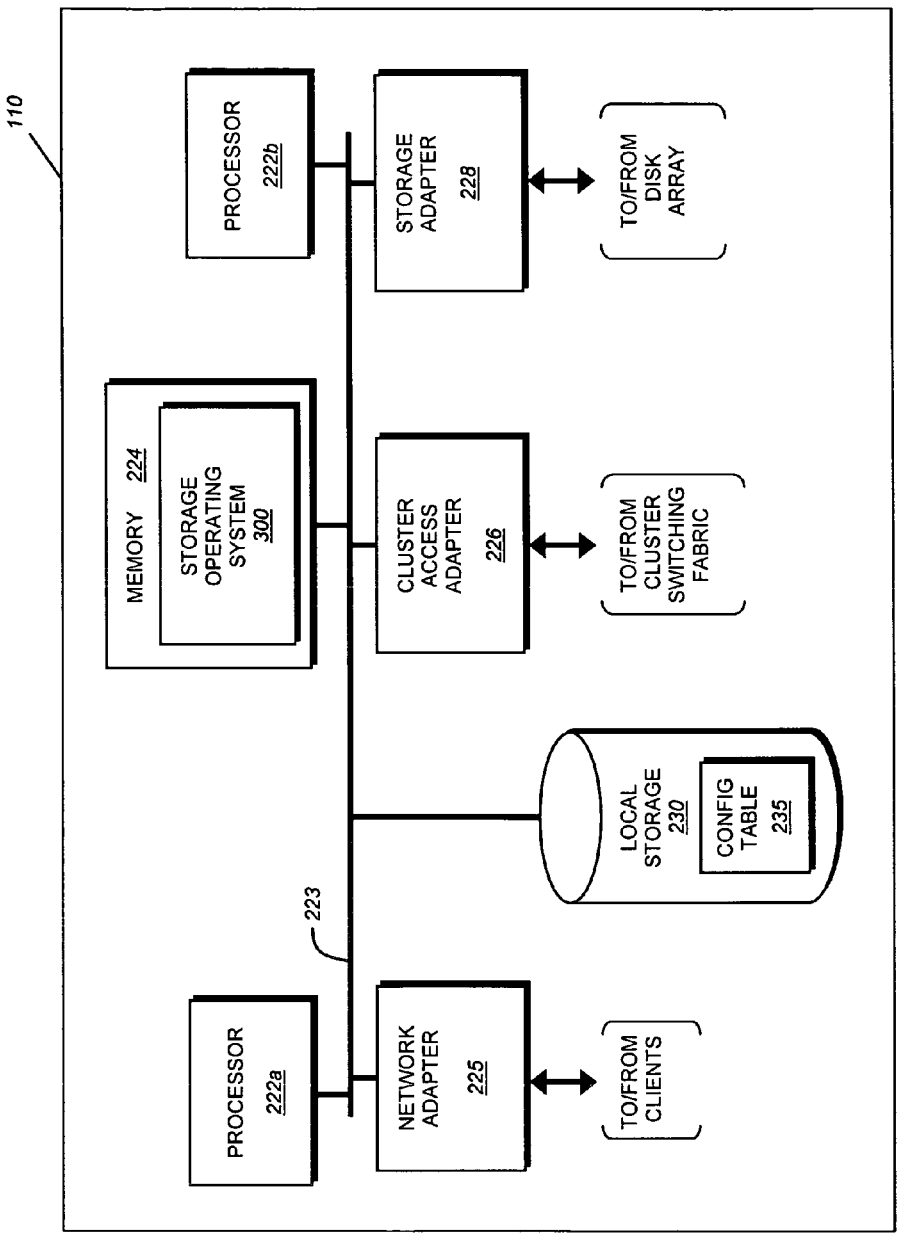
FIG. 2 is a diagram illustrating a module of the cluster, in accordance with an embodiment of the invention.

FIG. 2 is a diagram illustrating a module of the cluster 100, in accordance with an embodiment of the invention. Specifically, a node 110 is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks 140, utilized by the node 110 to locally store configuration information (e.g., in configuration table 235) provided by one or more management processes. The cluster access adapter 226 comprises a plurality of ports adapted to couple the node 110 to other nodes 110 of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 110 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 110 may alternatively comprise a single or more than two processor system. Illustratively, one processor 222*a* can execute the functions of the N-module 120 on the node, while the other processor 222*b* can execute the functions of the D-module. It should also be appreciated that processors 222*a,b* may include multiple processing cores, thus improving the processing speed of the processors 222*a, b.*

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 110 by, inter alia, invoking storage operations in support of the storage service implemented by the node 110.

The network adapter 225 comprises a plurality of ports adapted to couple the node 110 to one or more clients 170 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the connection system 180 may be embodied as an Ethernet network or a Fibre Channel (FC) network. Each client 180 may communicate with the node 110 over the connection system 180 by exchanging discrete frames or packets of data according to pre-defined protocols, such as TCP/IP.

The storage adapter 228 cooperates with the storage operating system 300 executing on the node 110 to access information requested by the clients 170. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 140 of the disk array 150. The storage adapter 228 comprises a plurality of ports having input/output (I/O) interface circuitry that couples to the disks over an I/O interconnect arrangement, such as a conventional high-performance, FC link topology.

In accordance with an exemplary embodiment of the present invention, storage of information on each disk array 150 is preferably implemented as one or more storage locations, or "volumes," that comprise a collection of physical storage disks 140 cooperating to define an overall logical arrangement of volume block number (vbn) space on the volume(s). Each logical volume is generally, although not necessarily, associated with its own file system. The disks 140 within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Storage Operating System

Figure 3:
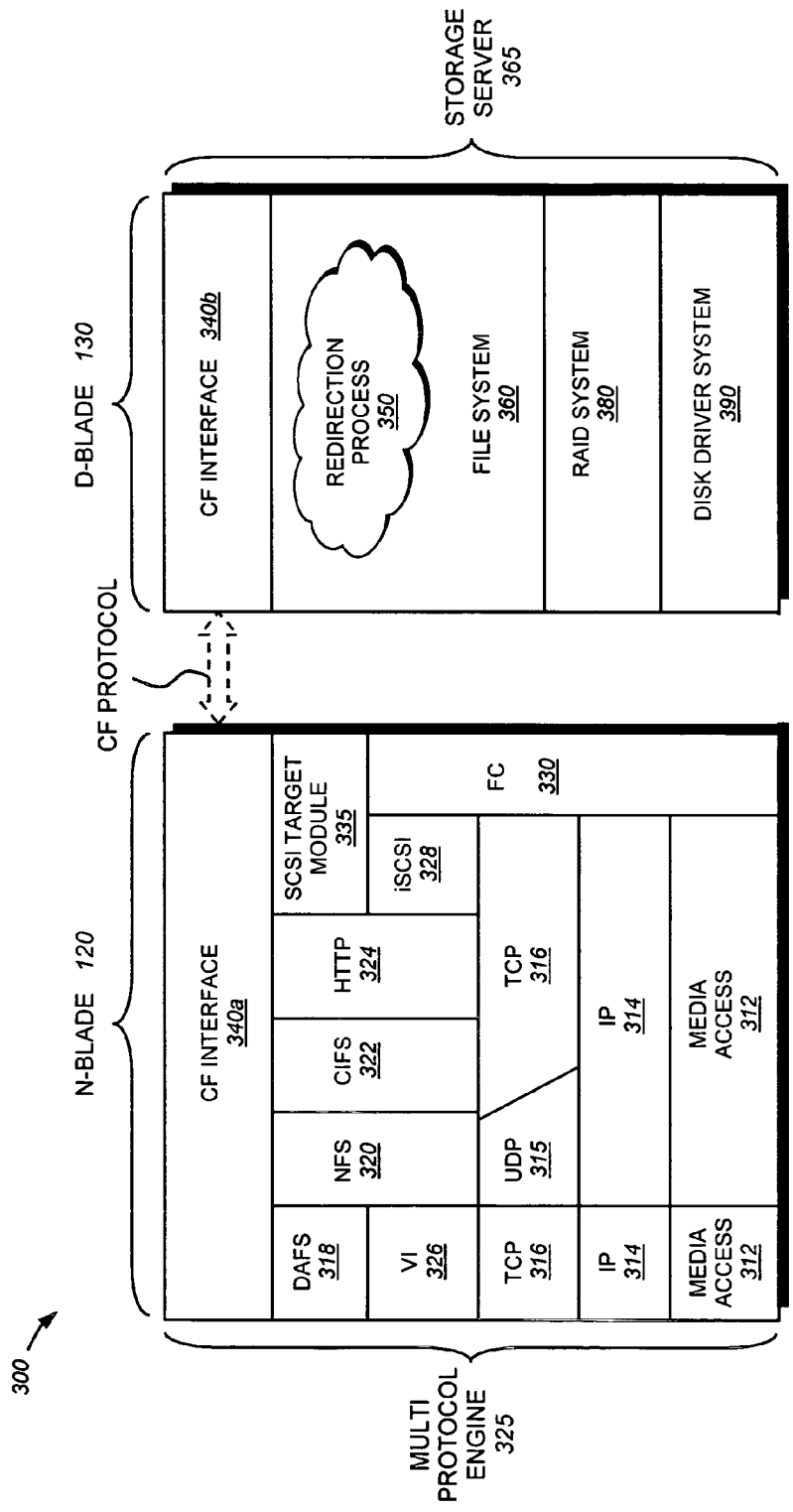
FIG. 3 is a diagram further illustrating a storage operating system capable of redirection, in accordance with an embodiment of the invention.

To facilitate access to the disks 140, the storage operating system 300 of FIG. 3 implements a write-anywhere file system that cooperates with one or more virtualization modules to "virtualize" the storage space provided by the disks 140. A file system 360 logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system 300 is preferably the NetApp® Data ONTAP® operating system available from Network Appliance Inc., of Sunnyvale, Calif., that implements a Write Anywhere File Layout (WAFL®) file system. However, it is expressly contemplated that any appropriate storage operating system may be enhanced for use in accordance with the inventive principles described herein. As such, the storage operating system 300 should be taken broadly to refer to any storage operating system that is otherwise adaptable to the teachings of this invention.

FIG. 3 is a diagram further illustrating a storage operating system 300 that is capable of redirection, in accordance with an embodiment of the invention. The storage operating system 300 comprises a series of software layers organized to form an integrated network protocol stack or, more generally, a multi-protocol engine 325 that provides data paths for clients 170 to access information stored on the node 110 using block and file access protocols. The multi-protocol engine 325 includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. A iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 110.

In addition, the storage operating system 300 includes a series of software layers organized to form a storage server 365 that provides data paths for accessing information stored on the disks of the D-blade 130. To that end, the storage server 365 includes a file system module 360 for managing volumes, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 also implements processes, such as a redirection process 350, in an exemplary embodiment of the present invention. The redirection process 350 includes one or more computer-readable instructions that manage redirection identifiers of storage locations, or volumes, as previously described above. Within the clustered storage system with multiple D-modules, multiple volumes may be associated with a single D-module, or multiple volumes may be allocated among multiple D-modules. For example, volumes distributed among multiple D-modules may be implemented with striped volumes of data, e.g. round-robin allocation of data among the striped volumes. However, any method of distributing multiple volumes among D-modules or multiple volumes sharing a single D-module are possible, as long as the volumes include redirection identifiers that redirect data access requests when the data is not found in a particular volume. The redirection process 350 manages the redirection identifiers by interfacing with management commands from an administrator, who can enter a command to create a redirection identifier for a particular volume, by using a graphical user interface (GUI), command line interface (CLI), or the like. The creation of redirection identifiers is further described with respect to FIG. 6.

Further, the file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 110. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks 140. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file-handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 170 is forwarded as a packet over the connection system 180 and onto the node 110 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 140 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 140 and loads the requested data block(s) in memory for processing by the node. Upon completion of the request, the node 110 (and operating system) returns a reply to the client 170 over the connection system 180.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 110 in response to a request issued by the client 170. Moreover, in another alternate embodiment of the invention, the processing elements of adapters 225, 228 may be configured to offload some or all of the packet processing and storage access operations, respectively, from processor 222, to thereby increase the performance of the storage service provided by the node 110. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 110, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In an illustrative embodiment, the storage server 365 is embodied as D-module of the storage operating system 300 to service one or more volumes of the disk array 150. In addition, the multi-protocol engine 325 is embodied as N-module to (i) perform protocol termination with respect to a client issuing incoming data access request packets over the connection system 180, as well as (ii) redirect those data access requests to any storage server 365 of the cluster 100. Moreover, the N-module and D-module cooperate to provide a highly-scalable, distributed storage system architecture of a clustered storage system. To that end, each module includes a cluster fabric (CF) interface module 340a,b adapted to implement intra-cluster communication among the modules, including D-module-to-D-module communication for data container (e.g., a file) access operations.

The protocol layers, e.g., the NFS/CIFS layers and the iSCSI/FC layers, of the N-module function as protocol servers that translate file-based and block-based data access requests from clients into CF protocol messages used for communication with the D-module. That is, the N-module convert the incoming data access requests into file system primitive operations (commands) that are embedded within CF messages by the CF interface module 340 for transmission to the D-modules of the cluster 100. Notably, the CF interface modules 340 cooperate to provide a single file system image across all D-modules in the cluster 100. Thus, any network port of an N-module that receives a client 170 request can access any data container within the single file system image located on any D-module of the cluster 100.

Further to the illustrative embodiment, the N-module and D-module are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 160. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc.

Figure 4:
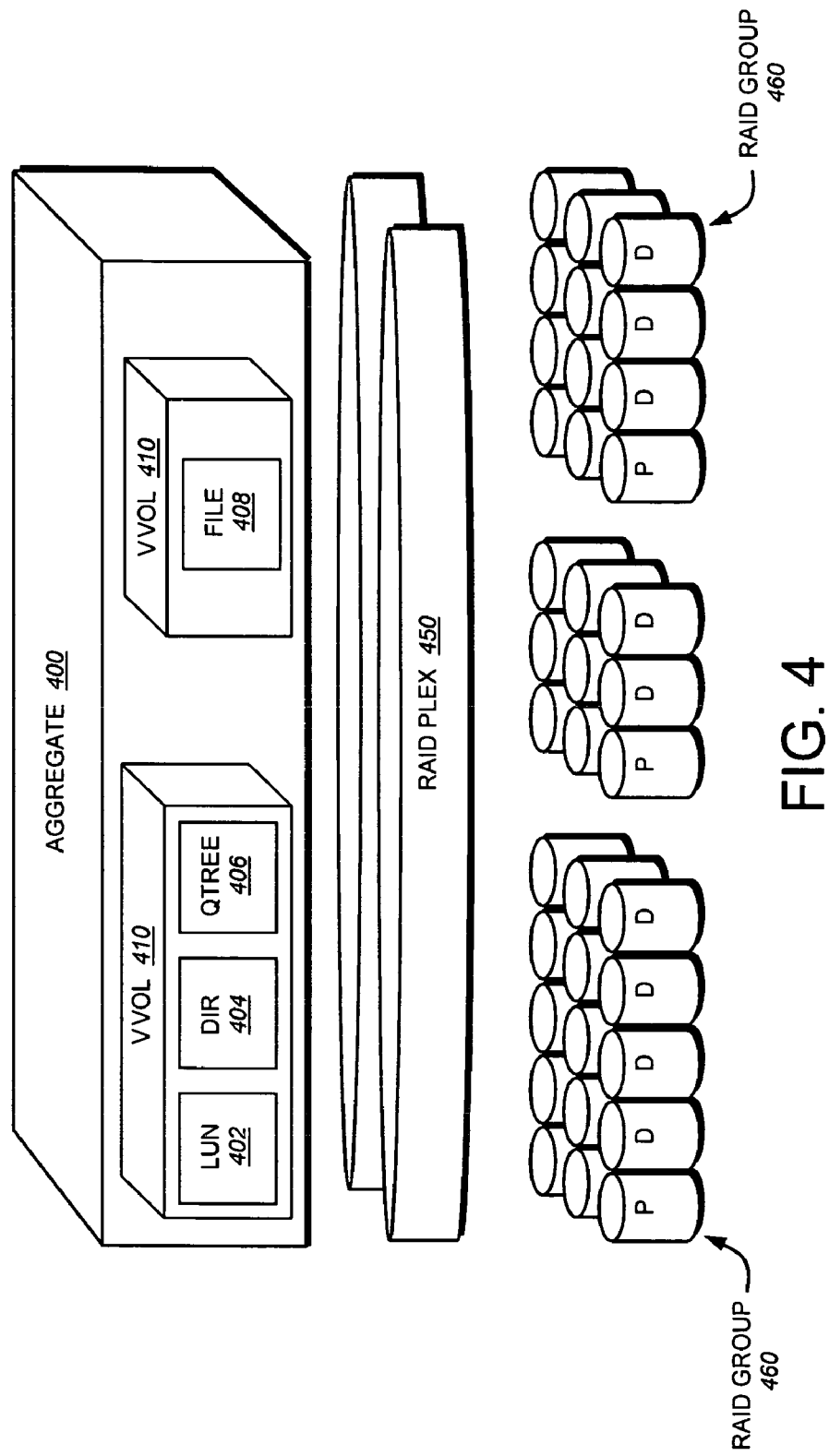
FIG. 4 is a diagram illustrating an aggregate for organizing data in volumes, in accordance with an embodiment of the invention.

FIG. 4 is a diagram illustrating an aggregate 400 for organizing data in volumes, in accordance with an embodiment of the invention. Specifically, the volume of a node 110 can be a flexible volume 410 or a traditional volume. A traditional volume is a collection of specific disks 140 or RAID groups of the disks 140 that are established by an administrator. A flexible volume is a logical entity that has flexibility in disk 140 or RAID group allocations. Specifically, sizing a flexible volume can occur on the fly, i.e. real-time, thus avoiding possible disk over-allocations, such as over-allocations for traditional volumes that possibly consume more disk space than is needed at any particular point in time. Thus, flexible volume sizes can range, e.g. in Megabytes (MB) or Gigabytes (GB).

In an exemplary embodiment, luns (blocks) 402, directories 404, qtrees 406 and files 408 may be contained within flexible volumes 410, such as dual vbn flexible volumes, that, in turn, are contained within the aggregate 400. The aggregate 400 is illustratively layered on top of the RAID system, which is represented by at least one RAID plex 450 (depending upon whether the storage configuration is mirrored), wherein each plex 450 comprises at least one RAID group 460. Each RAID group further comprises a plurality of disks 430, e.g., one or more data (D) disks and at least one (P) parity disk. Whereas the aggregate 400 is analogous to a physical volume of a conventional storage system, a flexible volume is analogous to a file within that physical volume. That is, the aggregate 400 may include one or more files, wherein each file contains a flexible volume 410 and wherein the sum of the storage space consumed by the flexible volumes is physically smaller than (or equal to) the size of the overall physical volume.

Figure 5:
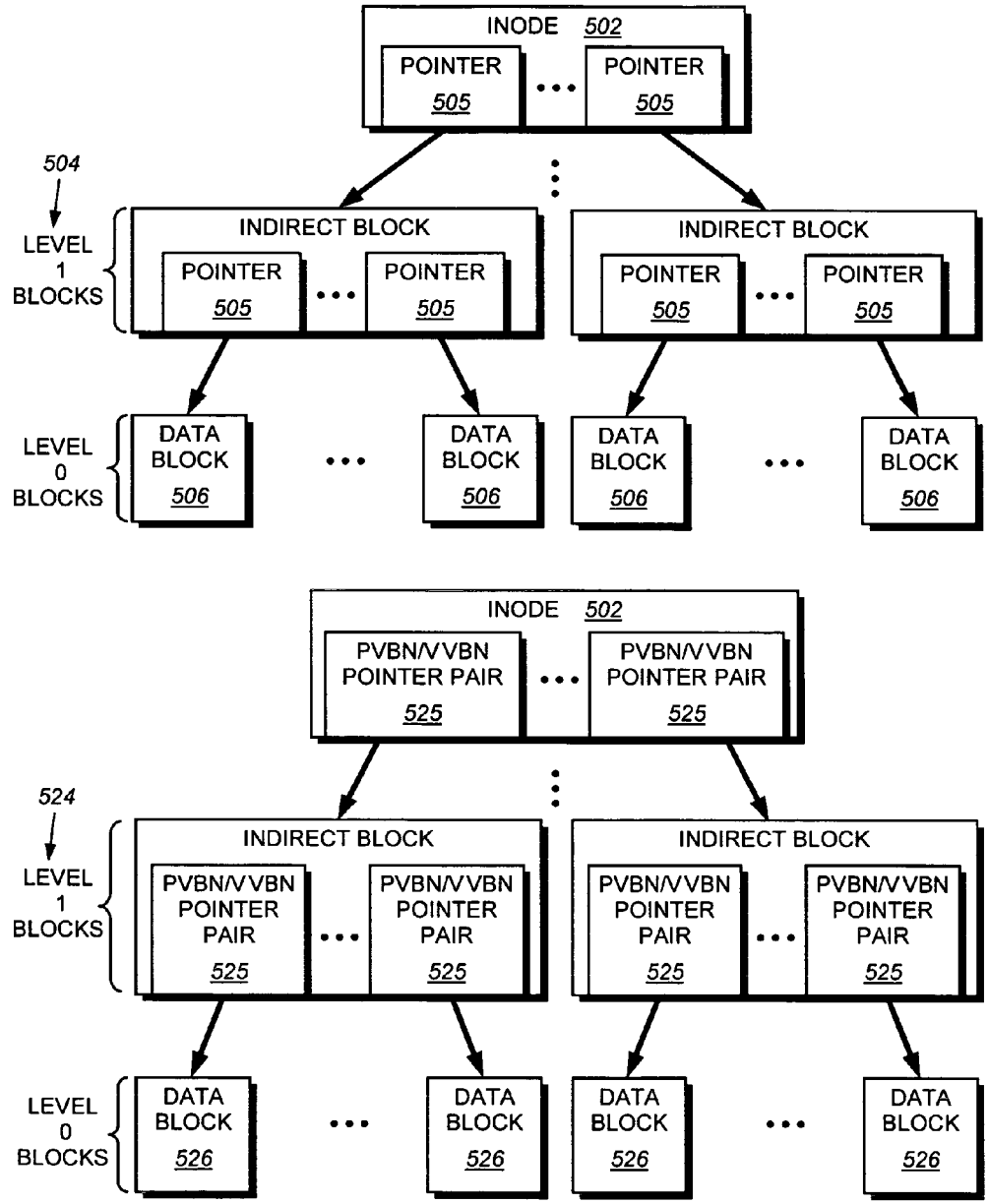
FIG. 5 is a diagram illustrating a buffer tree used in the organization of data, in accordance with an embodiment of the invention.

FIG. 5 is a diagram illustrating a buffer tree used in the organization of data, in accordance with an embodiment of the invention. The buffer tree is an internal representation of blocks for a file (e.g., file 408) loaded into the memory 224 and maintained by the write-anywhere file system 360. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pointers 505 that ultimately reference data blocks 506 used to store the actual data of the file. That is, the data of file 408 are contained in data blocks and the locations of these blocks are stored in the indirect blocks of the file. Each level 1 indirect block 504 may contain pointers to as many as 1024 data blocks. According to the "write anywhere" nature of the file system, these blocks may be located anywhere on the disks 140.

A file system layout is provided that apportions an underlying physical volume into one or more virtual volumes (or flexible volume) of a storage system, such as node 110. In an exemplary embodiment, the underlying physical volume is an aggregate 400 comprising one or more groups of disks, such as RAID groups, of the node 110. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 408) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. For example, in FIG. 5, a root (top-level) inode 520, such as an embedded inode, references indirect (e.g., level 1) blocks 524. Note that there may be additional levels of indirect blocks (e.g., level 2, level 3) depending upon the size of the file. The indirect blocks (and inode) contain pvbn/vvbn pointer pair structures 525 that ultimately reference data blocks 526 used to store the actual data of the file.

The pvbns reference locations on disks of the aggregate 400, whereas the vvbns reference locations within files of the flexible volume. The use of pvbns as block pointers 525 in the indirect blocks 524 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

File System Organization

Figure 6:
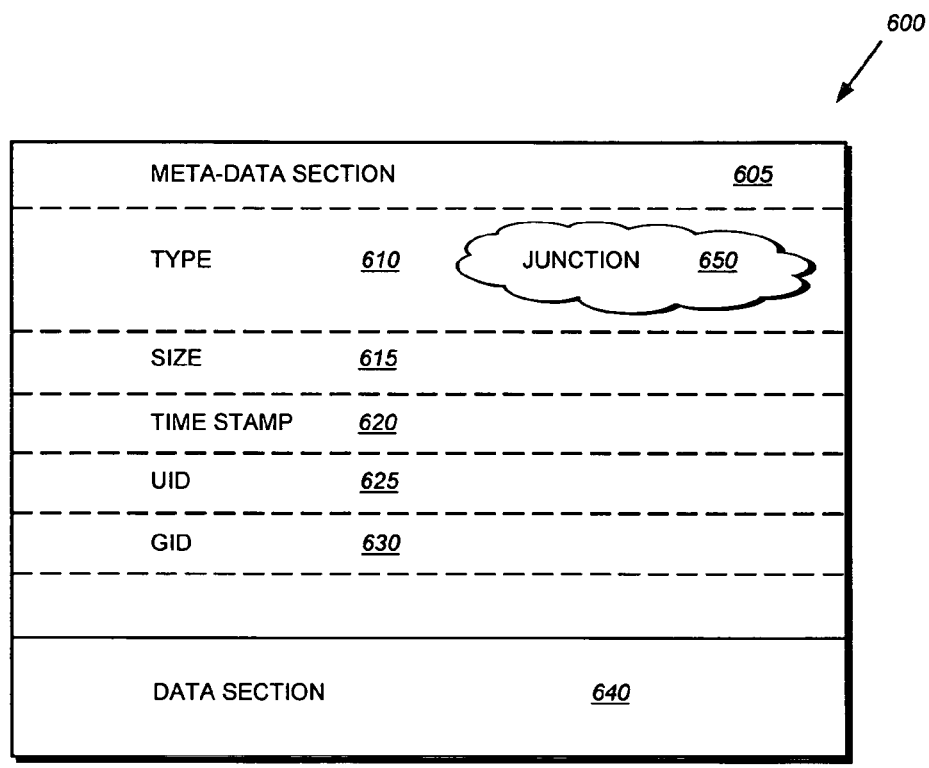
FIG. 6 is a diagram illustrating a structure containing information to enable redirection, in accordance with an embodiment of the invention.

FIG. 6 is a diagram illustrating a structure containing information to enable redirection, in accordance with an embodiment of the invention. In an exemplary embodiment, the structure is an inode data structure adapted for storage on the disks 140. An inode 600 includes a meta-data section 605 and a data section 640. The information stored in the meta-data section 605 of each inode 600 describes a data container (e.g., a file) and, as such, includes the type (e.g., regular, directory, vdisk, junction 650) 610 of file, its size 615, time stamps (e.g., access and/or modification time) 620 and ownership, i.e., user identifier (UID 625) and group ID (GID 630), of the file. In one exemplary embodiment, the junction 650 is a 32-bit field. However, other exemplary embodiments may use any size for the bit field as long as the field is capable of storing information regarding the redirection identifier. Further, the inode 600 includes the data section 640. Specifically, the data section 640 may include file system data or pointers; the latter referencing 4 kB data blocks on a disk used to store the file system data. Each pointer is preferably a logical vbn to facilitate efficiency among the file system and the RAID system 380 when accessing the data on disks.

The junction 650 type is a hint that there is a volume mounted at the junction. However, the junction does not explicitly include the location for the volume mounted at the junction. Instead, a storage location repository includes the location information of the volume. Thus, the junction 650 is a redirection identifier associated with a storage location indicating that the data is not stored at the storage location where the data is originally sought, but is available at some other storage location. The information about the mounted volume is retained by a storage location repository, as later described with respect to FIG. 7.

Junctions 650 are "mounted" during volume 410 creation by the implementation of a management command from a CLI, GUI, or the like. For example, the command may be "create a volume and mount it on the pathname "/a/b/c." The pathname "/a/b/c" indicates that the directory names are parent directory "a," followed by sub-directory "b." The last component, "c" is a junction 650. The new volume 410 is created on an aggregate 400. The new volume 410 identification and the junction 650 inode information are recorded in a storage location repository, such as the VLDB 730. Thus, when looking for the "/a/b/c/file," the junction at the volume containing the component of the pathname "c" would be a hint that the "file" is located on another volume.

For example, if an exemplary file system operation is "find /a/b/c/file," then the search begins with "/a." At the volume including "/a," the pathname is parsed, or separated, to look for "/b." However, at "/a," a junction 650 may indicate that another volume contains the "file." This is a hint that the storage location repository should be examined. Specifically, the storage location repository is examined for a volume location identifier and inode identifier. Alternatively, if no junction 650 type is encountered at "/a," then there is no reason to examine the storage location repository.

When creating junction 650 types, some rules can be applied. For example, one rule can be that junction types cannot be stored in other junction 650 types, which can be implemented by mounting volumes only once in the namespace. Another rule is that permission for read access to junctions is fully allowed for all file system operations. This rule is a presumption that authentication to the clustered storage system has occurred. Specifically, if authentication has not yet occurred, meaning that users may not access data stored on the clustered storage system, then permissions can be associated per junction to grant or restrict access to data. It should be appreciated that other rules for junctions are possible, as long as the rules allow for efficient and simple management of junctions, thus minimizing administrative oversight.

Figure 7:
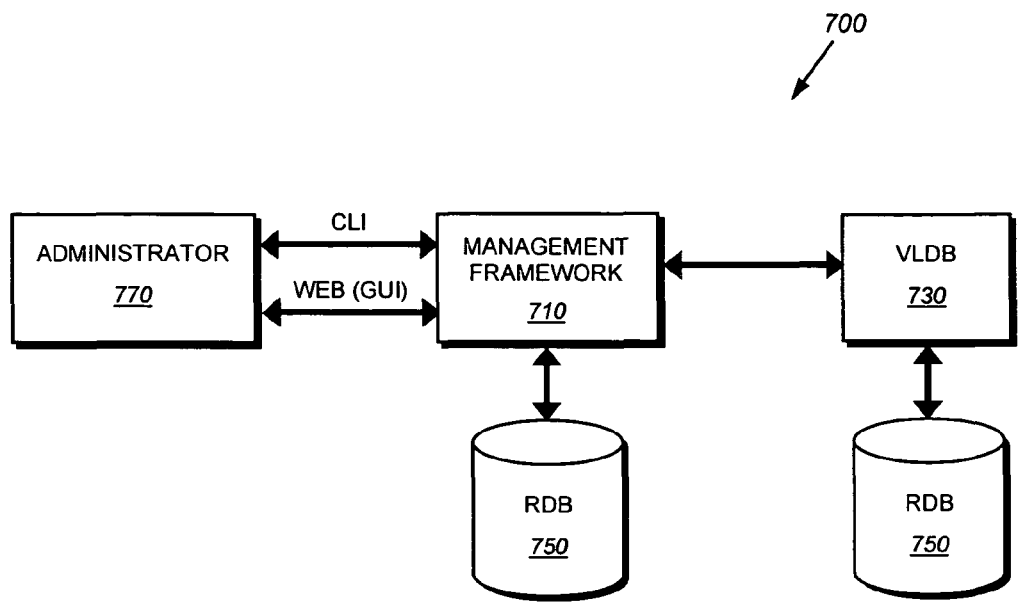
FIG. 7 is a diagram illustrating a collection of management processes, in accordance with an embodiment of the invention.

In accordance with an embodiment of the invention, FIG. 7 is a diagram illustrating a collection of management processes to manage data stored on one or more storage locations of the clustered storage system. The management processes execute as user mode applications 700 on the storage operation system of the clustered storage system to provide management of configuration information (i.e. management data) for all the nodes 110. To that end, the management processes include a management framework process 710 and a volume location database (VLDB) process 730, each utilizing a data replication service (RDB 750) linked as a library. The management framework 710 provides an administrator 770 interface via a command line interface (CLI), a web-based graphical user interface (GUI), or the like. The management framework is illustratively based on a conventional common interface model (CIM) object manager that provides the entity to which administrators interact with a node 110 in order to manage the cluster. The VLDB process 730 is a database process that tracks the storage locations of various storage components (e.g., flexible volumes, aggregates, etc.) within the cluster to thereby facilitate routing of requests throughout the clustered storage system.

The management processes have interfaces to (are closely coupled to) RDB 750. The RDB comprises a library that provides a persistent object store (storing of objects) for the management data processed by the management processes. Notably, the RDB 750 replicates and synchronizes the management data object store access across all nodes 110 of the cluster to thereby ensure that the RDB database image is identical on all of the nodes 110. At system startup, each node 110 records the status/state of its interfaces and IP addresses (those IP addresses it "owns") into the RDB database. Specifically, the VLDB process 730 and the RDB 750 operate together to function as a storage location repository. It should be appreciated that separation of the VLDB process and the RDB is purely exemplary. Accordingly, in another exemplary embodiment, a storage location repository may be implemented as a VLDB having an integrated database functioning as a persistent object store. Via the administrator interface 770, which may be operated on a node 110 or client 170, management tools may be used to create, modify, and check inconsistencies of the entries of the storage location repository. Such exemplary tools are useful for maintaining the replicated database within the clustered storage system, thus avoiding or preventing data inconsistencies within the storage system repository.

In an exemplary embodiment, the storage location repository also includes a junction table (not shown) having table entries, such as an inode 600 identifier (or filehandle), a child of a master set identifier (MSID) that indicates the child volume pathname identifier, and a data set identifier (DSID) that uniquely identifies a single instance of a volume. The MSID identifies a "master" or active volume that is identically replicated in the clustered storage system. As each junction 650 type is created in an inode 600, the junction table of the storage location repository is updated. Further, as volume pathnames are updated, the junction table entries associated with the volume pathname is updated. However, as previously described, the junction 650 type of an inode 600 is not updated. Thus, upon encountering a junction 650 type, the storage location repository, and specifically, the junction table is examined to find the next storage location to search for data. In this fashion, the junction table can function as a "mount table" that is replicated throughout the clustered storage system.

Figure 8:
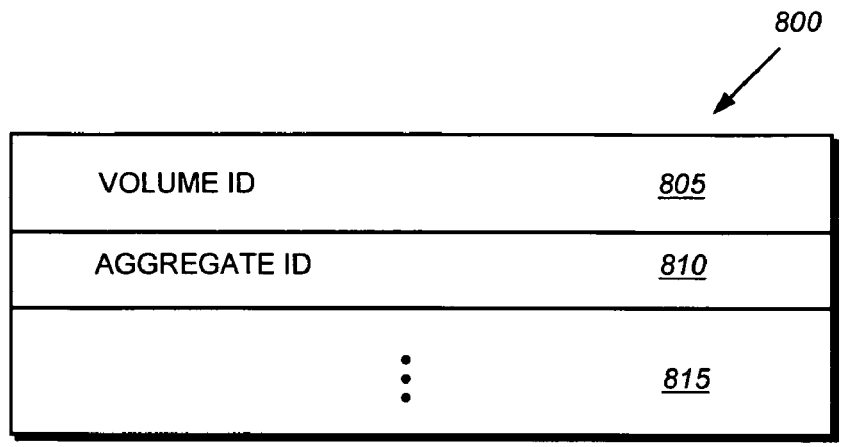
FIG. 8 is a diagram illustrating a volume location database (VLDB) volume entry, in accordance with an embodiment of the invention.

FIG. 8 is a diagram illustrating a volume location database (VLDB) volume entry, in accordance with an embodiment of the invention. In an exemplary embodiment, the N-module of each node 110 accesses a configuration table 235 that maps volume identifiers to a D-module that "owns" (services) a data container within the clustered storage system. The N-module also includes at least one high-speed memory cache to store frequently accessed VLDB information. It should be appreciated that all VLDB information is stored in a database that may be stored on slower-speed memory. Thus, cached VLDB entries that are frequently-sought are discovered faster than infrequently-sought VLDB entries.

Figure 9:
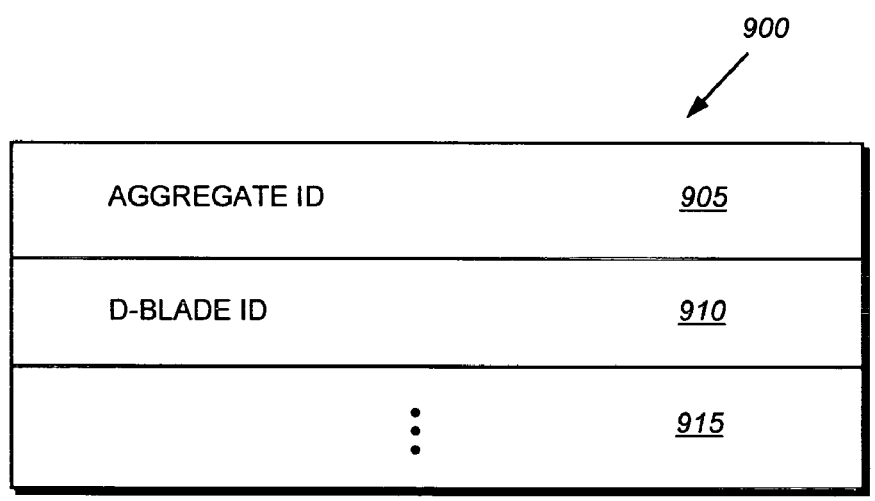
FIG. 9 is a diagram illustrating a VLDB aggregate entry, in accordance with an embodiment of the invention.

The VLDB is capable of tracking the locations of volumes and aggregates of nodes 110. Specifically, the VLDB includes a plurality of entries which, in turn, provide the contents of entries in the configuration table 235. Among other things, the VLDB entries keep track of the locations of the flexible volumes (hereinafter generally "volumes") and aggregates 500 within the clustered storage system. FIG. 8 is a diagram illustrating an exemplary VLDB volume entry 800, in accordance with an embodiment of the invention. Further, FIG. 9 is a diagram illustrating a VLDB aggregate entry, in accordance with an embodiment of the invention. Thus, examples of VLDB entries include the VLDB volume entry 800 and the VLDB aggregate entry 900.

The VLDB entry 800 of FIG. 8 includes a volume ID field 805, an aggregate ID field 810 and, in alternate embodiments, additional fields 815. The volume ID field 805 contains an ID that identifies a volume used in a volume location process. The aggregate ID field 810 identifies the aggregate containing the volume identified by the volume ID field 805. Likewise, FIG. 9 illustrates an exemplary VLDB aggregate entry 900. The VLDB aggregate entry 900 includes an aggregate ID field 905, a D-blade ID field 910 and, in alternate embodiments, additional fields 915. The aggregate ID field 905 contains an ID of a particular aggregate in the clustered storage system. The D-blade ID field 910 contains an ID of the D-blade hosting the particular aggregate identified by the aggregate ID field 905.

The VLDB illustratively implements a RPC interface, e.g., an ONC RPC interface, which allows the N-blade to query the VLDB. When encountering contents of a data container handle that are not stored in its configuration table, the N-blade sends an RPC to a VLDB process. In response, the VLDB process returns to the N-blade the appropriate mapping information, including an ID of the D-blade that owns the data container. The N-blade caches the information in its configuration table 235 and uses the D-blade ID 910 to forward the incoming request to the appropriate data container. All functions and communication between the N-blade and D-blade are coordinated on a cluster-wide basis through the collection of management processes and the RDB library user mode applications, as described with respect to FIG. 7.

Redirection of Data Access Requests in a Clustered Storage System

Figure 10:
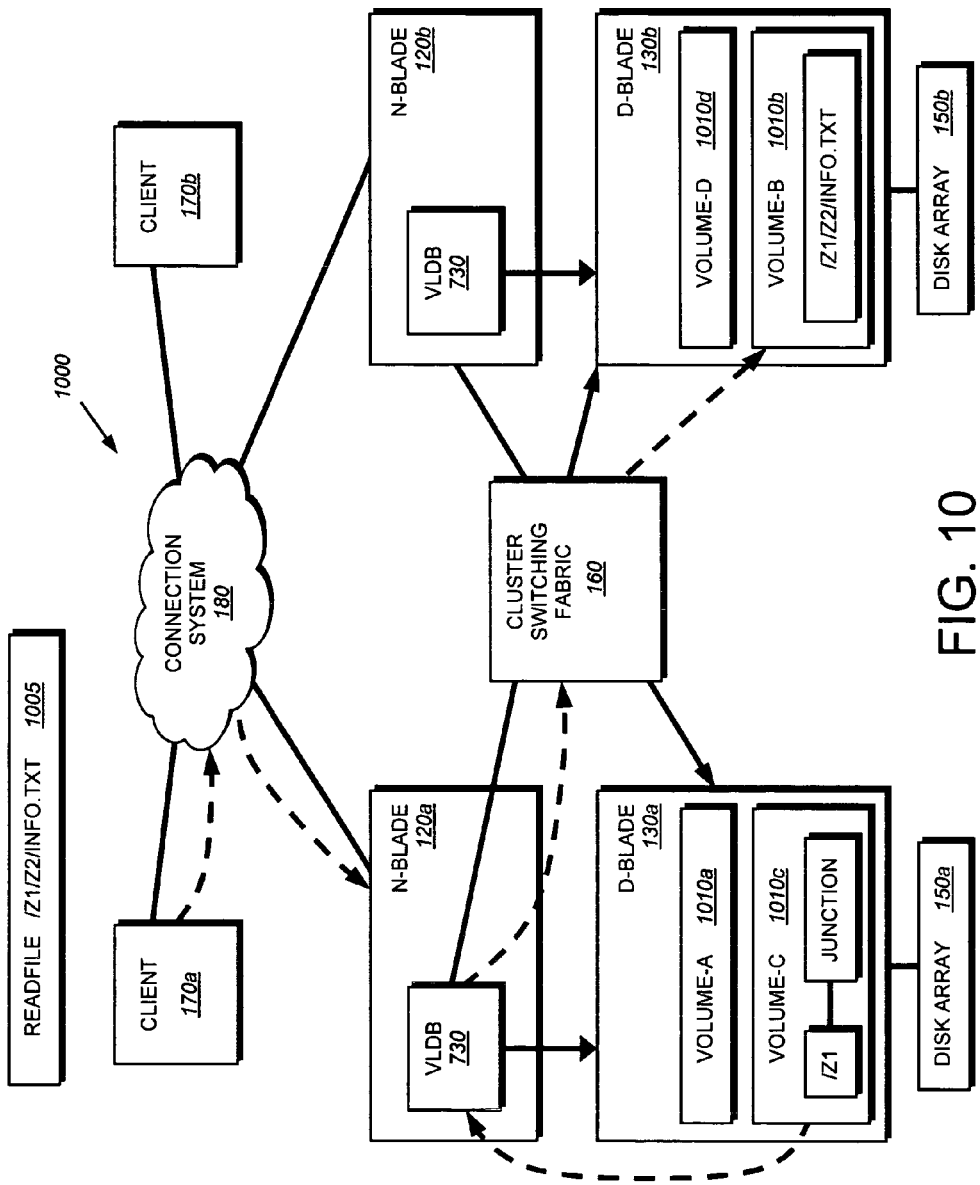
FIG. 10 is a diagram illustrating redirection of a file system operation in a clustered namespace, in accordance with an embodiment of the invention.

FIG. 10 is a diagram illustrating redirection of a file system operation in a clustered namespace 1000, in accordance with an embodiment of the invention. Illustratively, an exemplary file system operation 1005 is "readfile /z1/z2/info.txt," such that the data access request is to read a file "info.txt" stored in the pathname "/z1/z2." A client 170*a* may arbitrarily transmit the data access request via the connection system 180 to an N-module 120*a*, e.g. because the N-module 120*a* is geographically closer to the client 170*a* or perhaps if the N-module 120*a* is not as busy as N-modules in the clustered storage system. The N-module includes a storage location repository, implemented as a VLDB 730. The VLDB 730 is a replicated database and is also located on other N-modules, such as N-module 120*b*.

Upon arrival of the data access request at N-module 120*a*, the VLDB 730 is examined to determine the location of a volume that contains the pathname "/z1," such as described with respect to FIGS. 8 and 9. Illustratively, the VLDB 730 lists the locations of volume-A 1010*a* and volume-C 1010*c* on D-module 130*a* and volume-D 1010*d* and volume-B 1010*b* on D-module 130*b*. Initially, upon creation of "info.txt," the VLDB lists the location of "/z1" at volume-C 1010*c*. However, during the operation of the clustered storage system, the file "info.txt" moves to volume-B 1010*b*. Thus, when the search for "info.txt" proceeds to examining the inode 650 of volume-C 1010*c*, a junction 650 is encountered. Since the junction 650 is an indication that data is elsewhere, the VLDB 730 is once more examined. Specifically, the filehandle of volume-C 1010*c* is returned after encountering the junction type 650 in order to use the filehandle to look up the appropriate pathname in the junction table. It should be appreciated that in some exemplary embodiments, the next volume that may contain the sought-for data may be stored on another volume of the D-module 130*a*. In yet other exemplary embodiments, the sought-for data may reside on a volume of another D-module, e.g. D-module 130*b*.

Upon examining the VLDB 730 or cache for VLDB 730 information (e.g. cached junction table entries) by using the returned filehandle of the examined volume, the search is directed to volume-B 1010*b*. Thus, the search proceeds via the cluster switching fabric 160 to the D-module 130*b*. Ultimately, if the another junction type 650 is not encountered, then the file "info.txt" is found under the pathname "/z1/z2." Alternatively, if the junction type 650 or data is not found, the data is no longer accessible. By using the junction 650 type and the junction table, the continued parsing of the pathname "/z1/z2" in volume-C is unnecessary, thus saving time during the search. Further, by using the junction table, the individual volumes need not store volume identification information that requires complex administration to prevent broken chains.

Figure 11:
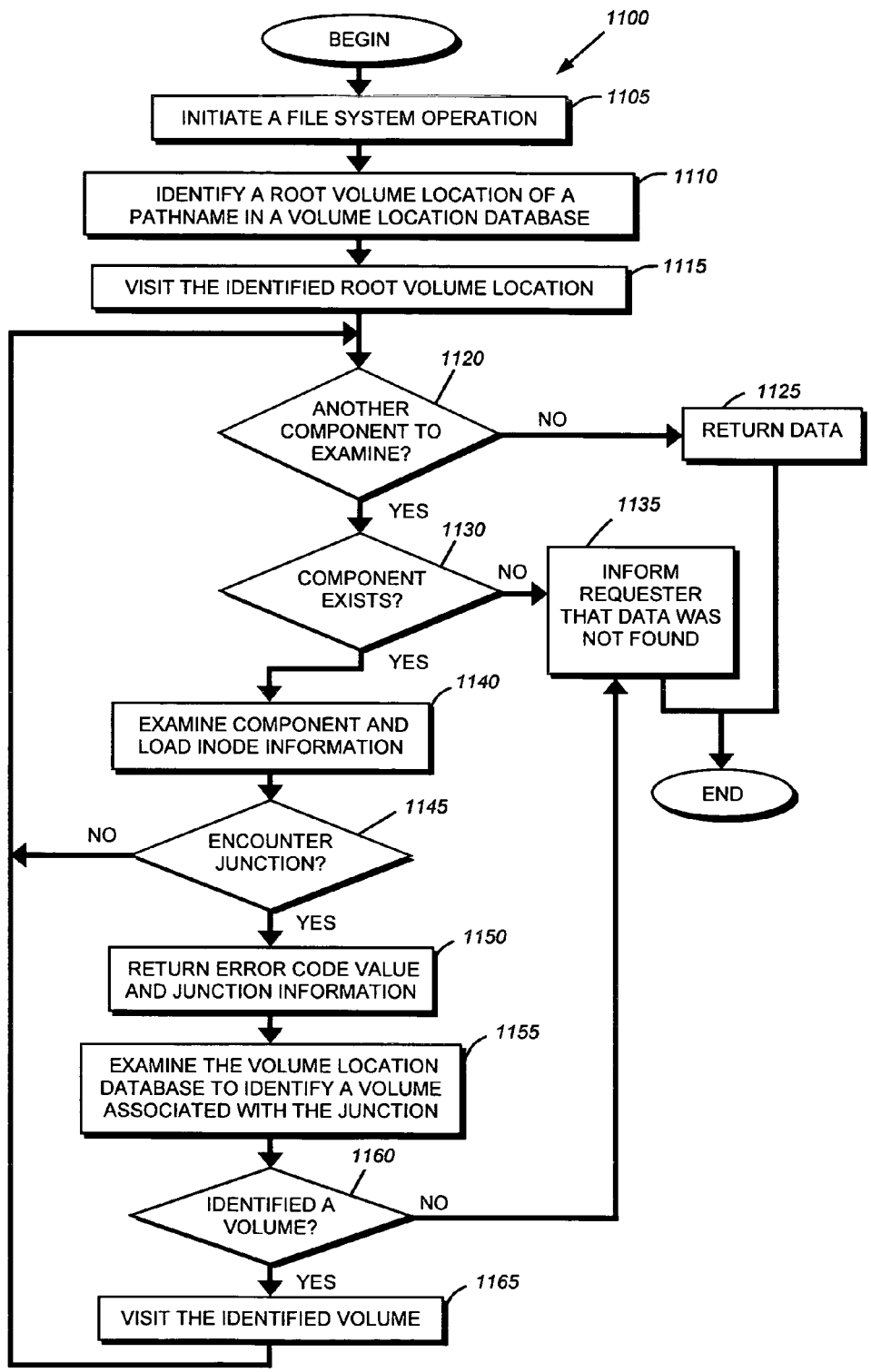
FIG. 11 is a flowchart diagram of operations for satisfying data access requests in a clustered namespace, in accordance with an embodiment of the invention.

FIG. 11 is a flowchart diagram of operations for satisfying data access requests in a clustered namespace, in accordance with an embodiment of the invention. For example, in a clustered namespace where multiple volumes can be created to store data, a process using multiple operations can be implemented with computer instructions. In operation 1105, a client computer can initiate a file system operation, such as "open textfile foo." Then, in operation 1110, the next process step is to identify a root volume location of a pathname in a volume location database. In an exemplary embodiment, the root volume is the top level directory, such as "/a" of the pathname "/a/b/foo.txt". Further, the storage location repository, or VLDB, is examined as part of operation 1110. Next, in operation 1115, the process moves to visiting, or accessing the identified root volume location. Thereafter, in operation 1120, the process examines the next component of the pathname. In the current example, the next component, if any, is "/b." It should be appreciated that any number of components can exist between the top level directory of the pathname to the data being sought. Thus, the pathname could be "/a/foo.txt" or "/a/b/c/d/e/ . . . /foo.txt/."

After operation 1130 verifies the existence of the first component of a pathname, the component's inode structure is read from a storage location, such as memory, in operation 1140. For example, verifying whether or not a component exists can be to identify the existence of an inode structure. When examining an inode structure of a component of a particular volume, a junction may be encountered in operation 1145. If a junction is encountered in operation 1145, then the process step includes a returned error code value and the junction information in operation 1150. It should be appreciated that the error code can be any value, expressed in binary, hexadecimal, or the like, that indicates an error of not finding the data sought. Further, the junction information includes filehandle information to perform a junction table lookup in the storage location repository. Accordingly, in operation 1155, the next process step is to examine the volume location database to identify a volume associated with the junction filehandle returned when encountering the junction. Specifically, the volume location database is examined to find an entry for a volume identifier and inode identifier matching the junction filehandle information. If the entry is not found in the volume location database, then the process step includes responding to the client computer with inode information associated with an unpopulated directory (i.e. an unpopulated directory contains a reference to the unpopulated directory and a reference to the parent directory of the unpopulated directory).

Thereafter, in operation 1160, if the junction table lists another volume to visit, then the next process step is to visit the identified volume in operation 1165. Alternatively, if there is no identified volume, then the next process step is operation 1135, further described below. Specifically, an identified volume may or may not reside on the same D-module where the junction was encountered. Thus, when encountering an identified volume, the process step then moves to operation 1120 to process any remainder of the pathname, including any additional junctions. Thus, if junctions are encountered continuously, then the process repeats. However, the process does not repeat indefinitely because during the creation of junctions, rules prevent such cycles. For example, one rule is to only allow the mounting of a volume in the clustered namespace only once, thus only causing one listing in the junction table.

Alternatively, if a junction is not encountered in operation 1145, then the next step proceeds to operation 1120 to determine whether the examined inode represented the last component of the pathname, and therefore, the process has found the data sought. If this inode was the last component and there is no other component to examine, then in operation 1125, the inode information and any data is returned to the client computer that initiated the data access request. Thereafter, the process ends. However, if there are more components to process in operation 1120, then the next component of the pathname is checked for its existence in operation 1130. If such a component exists, then the next step in the process moves to operation 1140. If another component does not exist, then the next step is proceed to operation 1135 to inform the requestor, such as the client computer, that the data was not found for the pathname. Thereafter, the process ends.

The operations herein described are purely exemplary and imply no particular order. Further, the operations can be used in any sequence when appropriate and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives accessible via network attached storage (NAS), Storage Area Networks (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention

What is claimed is:

1. A method of redirecting a data access request, comprising:
    receiving the data access request for data stored in a storage system comprising a processor;
    examining a storage location repository to identify a first storage location that stores the data;
    accessing the first storage location identified by the storage location repository to retrieve the data;
    encountering a redirection identifier at the first storage location, the redirection identifier indicating that the data is not stored in the first storage location and that the storage location repository should be reexamined to identify a second storage location that stores the data, the redirection identifier further providing information used to identify the second storage location, in the storage location repository, that stores the data;
    reexamining the storage location repository, that was examined to identify the first storage location, using the information to identify the second storage location that stores the data; and
    redirecting the data access request to the second storage location to access the data.

2. The method of claim 1, wherein the storage location repository is replicated within the storage system.

3. The method of claim 1, wherein the storage location repository organizes identifiers of a plurality of storage locations.

4. The method of claim 3, wherein the storage location repository further comprises determining a consistent state of the identifiers of the plurality of storage locations organized by the storage location repository.

5. The method of claim 1, wherein identifying the first storage location by examining the storage location repository further comprises associating a volume identifier with the first storage location.

6. The method of claim 1, wherein encountering the redirection identifier and reexamining the storage location repository using the information avoids continued examination of the first storage location and increases a speed of searching for the data in the storage system.

7. A system for redirecting data access requests, comprising:
    a network module configured to receive the data access request to access data stored in a storage system comprising a processor, the network module further configured to examine a storage location repository to identify a first storage location in the storage system that stores the data;
    a first disk module in communication with the network module and the storage location repository, the first disk module configured to access the first storage location identified by the storage location repository to encounter a redirection identifier indicating that the data is not stored in the first storage location, and that the storage location repository should be reexamined to identify a second storage location that stores the data, the redirection identifier further providing information used by the first disk module to reexamine the storage location repository, that was accessed to identify the first storage location, to identify the second storage location, in the storage location repository, that stores the data; and
    a second disk module in communication with the first disk module, the second disk module configured to receive the data access request and access the data stored at the second storage location.

8. The storage system of claim 7, wherein the storage location repository is a replicated database.

9. The storage system of claim 7, wherein a single instance of the replicated database is stored at the network module.

10. The storage system of claim 7, wherein the first and second disk modules are a same disk module.

11. The storage system of claim 7, further comprising:
    a management module that determines a consistent state of identifiers of a plurality of disk modules organized by the storage location repository.

12. The storage system of claim 7, wherein the first storage location is a volume including the redirection identifier.

13. The storage system of claim 7, wherein the redirection identifier that indicates reexamination of the storage location repository avoids continued examination of the first storage location and increases a speed of searching for the data in the storage system.

14. A computing environment, comprising:
    a memory store in communication with a first module and configured to store a storage location repository of identifiers, at least one of the identifiers identifying a location of a second module, wherein the memory store indicates data has moved from the second module to a third module; and
    a communication channel communicably coupling the first module to the second module, wherein the second module includes,
        a processor for processing instructions that instruct examination of a redirection identifier at the second module, wherein the redirection identifier indicates that the data is not stored at the second module, and that the storage location repository should be reexamined to identify the third module that stores the data, using information provided by the redirection identifier at the second module, the information identifying that the third module stores the data, the processor to reexamine the storage location repository, that was used to identify the second module, to identify the third module and access the data stored at the third module.

15. The computing environment of claim 14, wherein the storage location repository is a single instance of a replicated database.

16. The computing environment of claim 14, further comprising:
    a management module that is configured to determine a consistent state of volume identifiers.

17. The computing environment of claim 14, wherein the redirection identifier, that indicates reexamination of the storage location repository, avoids continued examination at the second module and increases a speed of searching for the data in the computing environment.

18. The computing environment of claim 14, wherein a result of a redirected data access request is an error condition.

19. A non-transitory computer readable storage medium containing executable program instructions executed by a processor, comprising:
    program instructions that receive a data access request for data stored in a storage system;
    program instructions that examine a storage location repository to identify a first storage location that stores the data;
    program instructions that access the first storage location identified by the storage location repository to retrieve the data;
    program instructions that encounter a redirection identifier at the first storage location, the redirection identifier indicating that the data is not stored in the first storage location and that the storage location repository should be reexamined to identify a second storage location that stores the data, the redirection identifier further providing information used to identify the second storage location, in the storage location repository, that stores the data;

program instructions that reexamine the storage location repository, that was examined to identify the first storage location, using the information to identify the second storage location that stores the data; and program instructions that redirect the data access request to the second storage location to access the data.

20. A method, comprising:

connecting a plurality of nodes to form a clustered storage system, wherein at least one of the plurality of nodes comprises a processor;

maintaining data on the clustered storage system, wherein the data has moved from a first storage location to a second storage location;

receiving a data access request for the data;

examining a storage location repository that identifies the first storage location that stores the data, wherein the storage location repository is replicated on each node of the clustered storage system;

accessing the first storage location identified by the storage location repository to retrieve the data;

encountering a redirection identifier at the first storage location, the redirection identifier indicating that the data is not stored in the first storage location and that the storage location repository should be reexamined to identify the second storage location that stores the data, the redirection identifier further providing information used to identify the second storage location, in the storage location repository, that stores the data;

in response to encountering the redirection identifier, reexamining the storage location repository, that was examined to identify the first storage location, using the information to identify the second storage location that stores the data; and redirecting the data access request to the second storage location to access the data.

21. The method of claim 20, wherein the storage location repository is a database.

22. The method of claim 20, wherein each node comprises at least one network module and at least one disk module.

\* \* \* \* \*